United States Patent
Ohta et al.

(10) Patent No.: US 8,216,651 B2
(45) Date of Patent: Jul. 10, 2012

(54) PLASTIC MULTI-LAYER STRUCTURE

(75) Inventors: Yoshihiro Ohta, Yokohama (JP);
Takayuki Ishihara, Yokohama (JP);
Ikuo Komatsu, Yokohama (JP); Hiroaki Goto, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 11/507,087

(22) Filed: Aug. 18, 2006

(65) Prior Publication Data
US 2007/0042145 A1 Feb. 22, 2007

Related U.S. Application Data

(63) Continuation of application No. PCT/JP2005/002713, filed on Feb. 21, 2005.

(30) Foreign Application Priority Data

Feb. 19, 2004 (JP) ................................. 2004-043287

(51) Int. Cl.
*B32B 1/06* (2006.01)
*B32B 1/08* (2006.01)
*B32B 1/00* (2006.01)

(52) U.S. Cl. ..................... 428/34.7; 428/34.5; 428/34.6; 428/35.7

(58) Field of Classification Search ................. 428/34.1, 428/34.8, 138, 34.5, 34.6, 34.7, 35.7; 430/138, 430/132; 204/412
See application file for complete search history.

(56) References Cited

U.S. PATENT DOCUMENTS

| | | | | |
|---|---|---|---|---|
| 4,554,190 A | * | 11/1985 | McHenry et al. | 220/62.21 |
| 5,139,760 A | * | 8/1992 | Ogawa et al. | 423/328.1 |
| 5,310,497 A | * | 5/1994 | Ve Speer et al. | 252/188.28 |
| 5,603,997 A | | 2/1997 | Lindgren et al. | |
| 6,228,284 B1 | * | 5/2001 | Ebner et al. | 252/188.28 |
| 2001/0008662 A1 | * | 7/2001 | Blinka et al. | 428/35.8 |
| 2002/0018865 A1 | | 2/2002 | Blinka et al. | |
| 2004/0043170 A1 | * | 3/2004 | Zimmerman et al. | 428/35.7 |

FOREIGN PATENT DOCUMENTS

| | | |
|---|---|---|
| EP | 0 540 075 | * 10/1992 |
| JP | 5-115776 | 5/1993 |
| JP | 5-230794 | 9/1993 |
| JP | 08-308917 A1 | 11/1996 |

(Continued)

OTHER PUBLICATIONS

Inorganic Cation Exchange Properties of Zeolite ZSM-5 Chu, P. ; Dwyer, F. G. Intrazeolite Chemistry. May 17, 1983, 59-78.*

(Continued)

*Primary Examiner* — Rena Dye
*Assistant Examiner* — Erik Kashnikow
(74) *Attorney, Agent, or Firm* — Hoffmann & Baron, LLP

(57) ABSTRACT

The present invention herein provides a plastic multi-layer structure which comprises an oxygen-barrier layer (A-1), an oxygen absorptive layer (B), and a thermoplastic resin layer (C) containing a high silica type zeolite material having a silica/alumina ratio of not less than 80; and a packaging material such as bottles for accommodating foods, for instance, a beverage and medical and pharmaceutical products. The plastic multi-layer structure possesses oxidation-barrier characteristics and the structure would permit the considerable reduction of the quantity of the oxidation by-products generated from the structure, even when used under a high humidity atmosphere.

24 Claims, 2 Drawing Sheets

FOREIGN PATENT DOCUMENTS

| | | |
|---|---|---|
| JP | 2001-039475 | 2/2001 |
| JP | 2002-504159 A1 | 2/2002 |
| JP | 2003-246026 | 9/2003 |
| JP | 2003-300292 | 10/2003 |
| JP | 2003-327848 | 11/2003 |
| WO | WO 97/32924 | 9/1997 |

OTHER PUBLICATIONS

Supplemental Search Report dated May 6, 2009.

Office Action issued in Japanese Patent Application No. JP08-030817 Dated Jan. 10, 2012.

* cited by examiner

US 8,216,651 B2

PLASTIC MULTI-LAYER STRUCTURE

CROSS-REFERENCE TO RELATED APPLICATIONS

This application is a continuation of International Application No. PCT/JP2005/002713, filed Feb. 21, 2005, which claims the benefit of Japanese Application No. 2004-043287, filed Feb. 19, 2004, the contents of all of which are incorporated herein by reference.

TECHNICAL FIELD

The present invention relates to an oxygen absorptive plastic multi-layer structure suitably used as a packaging material for packaging contents, which are quite liable to cause deterioration in the presence of oxygen gas, in particular, foods such as beverages and pharmaceuticals.

BACKGROUND OF THE INVENTION

As packaging containers, there have recently been used various kinds of plastic containers, because of their advantages, for instance, their light-weight characteristics, excellent transparency and their easy moldability.

However, the plastic containers are insufficient in the oxygen-barrier properties as compared with those observed for the metallic and glass containers and accordingly, they suffer from problems such that the contents packaged therein are degenerated and that the flavor of the contents are significantly deteriorated.

To solve such a problem associated with these plastic containers, the plastic containers have been so designed that they have walls prepared using multi-layer structures each having at least one layer of a resin having oxygen-barrier properties such as an ethylene-vinyl alcohol copolymer. In addition, there has been proposed a container provided with an oxygen-absorbing layer in order to remove the oxygen remaining in the container and the external oxygen gas possibly entering into the container. As oxygen gas-absorbers (deoxidizing agents) used in the oxygen-absorbing layer, there have been known, for instance, those each containing an oxygen scavenger consisting of, for instance, an ethylenically unsaturated hydrocarbon and a transition metal catalyst (see, for instance, Patent Document Nos. 1 to 3 specified below).

According to the method which makes use of such an oxygen scavenger consisting of an ethylenically unsaturated hydrocarbon and a transition metal catalyst, the ethylenically unsaturated hydrocarbon per se absorbs oxygen gas to thus ensure the oxygen-barrier properties of the scavenger. However, this method suffers from a problem such that the hydrocarbon material would generate low molecular weight decomposition products when the material absorbs oxygen gas and the decomposition products may adversely affect the taste and palatability as well as the flavor of the contents. To solve the foregoing problem, there has been disclosed a method for adding a neutralizing agent reactive with an acid, an alcohol or an aldehyde and more specifically, an inorganic base or an organic amine, while taking notice of the decomposition products (see Patent Document No. 4 specified below).

However, it has been found that the following problem arises: when using the container made of the known plastic multi-layer structure having oxygen-barrier properties in an atmosphere having a high humidity, the structure generates an increased amount of decomposition products formed through the oxidation thereof and this accordingly adversely affects, for instance, the taste of the contents, to a considerable extent. It has been found that the problem becomes more serious when storing the contents over a long time period under high temperature and high humidity conditions during the summer season and using such a container for packaging contents each having a high water content, in particular, liquid foods or pharmaceuticals.

Patent Document 1: Japanese Un-Examined Patent Publication (JP Kokai) 2001-39475
Patent Document 2: JP Kokai Hei 5-115776
Patent Document 3: JP Kokai Hei 8-502306
Patent Document 4: JP Kokai 2000-506087

SUMMARY OF THE INVENTION

It is an object of the present invention to provide a plastic multi-layer structure having oxidation-barrier properties and more specifically, to an oxygen absorptive plastic multi-layer structure, which permits the considerable reduction of the amount of decomposition products formed through the oxidation of the multi-layer structure, even when it is used in an atmosphere having a high humidity.

It is another object of the present invention to provide an oxygen absorptive plastic multi-layer structure, which permits the substantial reduction of the amount of decomposition products originated from the structure observed when it is used for accommodating contents each having a high water content and which has an only slight adverse effect on the quality of the contents such as the taste and palatability.

It is a further object of the present invention to provide a container prepared using the foregoing plastic multi-layer structure.

The present invention has been completed on the basis of such a finding that the foregoing problems associated with the conventional techniques can effectively be solved by the use of a multi-layer structure comprising an oxygen-barrier layer (A-1), an oxygen absorptive layer (B) and a thermoplastic resin layer (C) which are arranged in this order from the exterior to the interior (the side facing the contents thereof), in which a high silica type zeolite having a silica/alumina ratio of not less than 80 is incorporated into the thermoplastic resin layer (C).

According to an aspect of the present invention, there is thus provided a plastic multi-layer structure, which comprises an oxygen-barrier layer (A-1); an oxygen absorptive layer (B); and a thermoplastic resin layer (C) containing zeolite having a high silica content (hereunder referred to as "high silica-content zeolite") whose silica/alumina ratio is not less than 80.

According to another aspect of the present invention, there is also provided a container prepared using the foregoing plastic multi-layer structure.

DETAILED DESCRIPTION OF THE INVENTION

Figure 1:
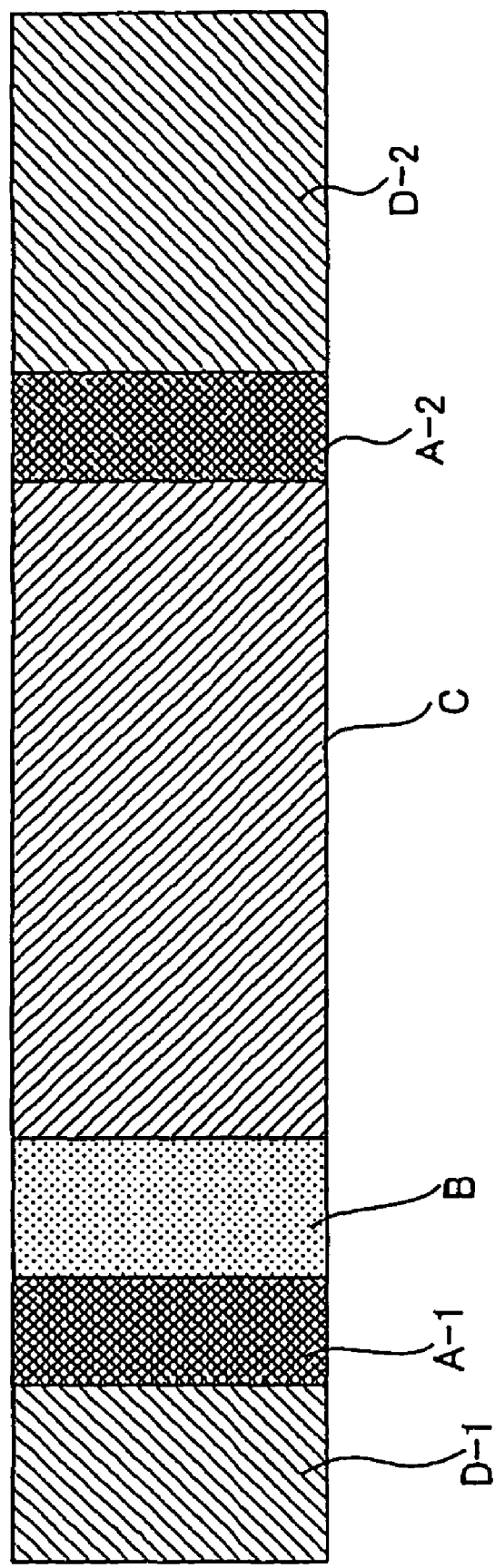
FIG. 1 shows the layer structure of an embodiment of the plastic multi-layer structure according to the present invention.

Ethylene-vinyl alcohol copolymers (EVOH) can, for instance, be used herein as the resin having oxygen-barrier properties, which constitutes the oxygen-barrier layer (A-1)

used in the plastic multi-layer structure according to the present invention. Usable herein as such copolymers include, for instance, saponified products of copolymers prepared by saponifying ethylene-vinyl acetate copolymers each having an ethylene content ranging from 20 to 60 mole % and preferably 25 to 50 mole % to a degree of saponification of not less than 96 mole % and preferably not less than 99 mole %.

The saponified product of ethylene-vinyl alcohol copolymer should have a sufficiently high molecular weight for allowing the formation of a film. In addition, the product in general has a viscosity of not less than 0.01 dl/g and preferably not less than 0.05 dl/g, as determined at 30° C. using a solution in an 85/15 (by weight) phenol/water mixed solvent.

Examples of other resins usable herein having oxygen-barrier properties include polyamide resins such as poly(met-axylidene adipamide) (MXD6); and polyester resins such as polyglycolic acid.

The thickness of the oxygen-barrier layer (A-1) is preferably set at a level ranging from 3 to 50 μm.

The oxygen absorptive layer (B) used in the multi-layer structure according to the present invention preferably comprises a polyolefin resin (b-1), a resin (b-2) other than the resin (b-1), which can serve as a trigger for the oxidation of the resin (b-1), and a transition metal catalyst (b-3).

In this respect, the polyolefin resin (b-1) may be, for instance, low density polyethylene, medium density polyethylene, high density polyethylene, linear low density polyethylene, linear ultra low density polyethylene, isotactic or syndiotactic polypropylene, ethylene-propylene copolymer, polybutene-1, ethylene-butene-1 copolymer, propylene-butene-1 copolymer, ethylene-propylene-butene-1 copolymer, ethylene-vinyl acetate copolymer, ionically crosslinked olefin copolymer, or a blend thereof. It is also possible to use an acid-modified olefinic resin obtained by modifying the foregoing resin, as a base polymer, through grafting with an unsaturated carboxylic acid or a derivative thereof. Preferably used herein as such resins are polyolefin resins each having ethylenic structures within the molecular structure thereof and specific examples thereof are low density polyethylene, medium density polyethylene, high density polyethylene, linear low density polyethylene, linear ultra low density polyethylene, and ethylenic copolymers such as ethylene-propylene copolymer and ethylene-butene-1 copolymer. Among these polyolefin resins, particularly preferred are low density polyethylene and linear low density polyethylene. These resins may be used alone or in any combination of at least two of them.

Usable herein as the resin (b-2) capable of serving as a trigger for the oxidation of the resin (b-1) are, for instance, resins having aliphatic carbon-carbon double bonds in the main chain or side chains; resins having tertiary carbon atoms within the main chain; and resins having active methylene groups in the main chain.

These trigger resins (b-2) may be incorporated into the resin (b-1) individually or in any combination of at least two of them.

Examples of the resins having aliphatic carbon-carbon double bonds in the main chain or side chains include resins containing units derived from linear or cyclic, conjugated or non-conjugated polyenes.

Examples of such monomers are conjugated dienes such as butadiene and isoprene; linear non-conjugated dienes such as 1,4-hexadiene, 3-methyl-1,4-hexa-diene, 4-methyl-1,4-hexadiene, 5-methyl-1,4-hexadiene, 4,5-dimethyl-1,4-hexadiene and 7-methyl-1,6-octadiene; cyclic non-conjugated dienes such as methyl tetrahydro-indene, 5-ethylidene-2-norbornene, 5-methylene-2-norbornene, 5-iso-propylidene-2-norbornene, 5-vinylidene-2-norbornene, 6-chloromethyl-5-iso-propenyl-2-norbornene, and dicyclo-pentadiene; and trienes such as 2,3-diiso-propylidene-5-norbornene, 2-ethylidene-3-isopropylidene-5-norbornene, and 2-propenyl-2,2-norbornadiene.

In addition, examples of resins having tertiary carbon atoms within the main chain thereof, suitably used herein, are polymers or copolymers each carrying units derived from an α-olefin having 3 to 20 carbon atoms, or polymers or copolymers each carrying benzene rings on side chains thereof. Specific examples of the foregoing α-olefins are propylene, 1-butene, 4-methyl-1-pentene, 1-hexene, 1-heptene, 1-octene, 1-nonene, 1-decene, 1-undecene, 1-dodecene, 1-tridecene, 1-tetra-decene, 1-pentadecene, 1-hexadecene, 1-heptadecene, 1-nonadecene, 1-eicosene, 9-methyl-1-decene, 11-methyl-1-dodecene and 12-ethyl-1-tetradecene. Specific examples of polymers include, in particular, polypropylene, poly-1-butene, poly-1-hexene, poly-1-octene, ethylene-propylene copolymer, ethylene-butene-1 copolymer and ethylene-propylene-1-butene copolymer. The foregoing monomer carrying a benzene ring on a side chain thereof may be, for instance, alkenyl benzenes such as styrene, 3-phenylpropene and 2-phenyl-2-butene. Specific examples of the polymers thereof are polystyrene, styrene copolymer, styrene-butadiene copolymer or styrene-isoprene copolymer.

Moreover, the foregoing resin having active methylene groups in the main chain may be one carrying, in the main chain thereof, an electron attractive group, in particular, a carbonyl group and a methylene group adjacent to the carbonyl group and specific examples thereof include copolymers of carbon monoxide and olefins, in particular, carbon monoxide-ethylene copolymers.

Particularly preferred resins (b-2) are polystyrenes or styrene copolymers each carrying, on side chains thereof, benzene rings while taking into consideration the function thereof as a trigger for the oxidation of the resin (b-1).

As such styrene copolymers, preferred are those having a content of styrene moieties of not less than 10% by mass and more preferably those having a content of styrene moieties ranging from 15 to 50% by mass while taking notice of their radical-generation efficiency.

Moreover, if the styrene copolymer is a block copolymer, it shows an additional advantage such that it is excellent in the compatibility with the resin (b-1) and the dispersibility therein.

In addition, the styrene copolymer is preferably a block copolymer having, at the end of the molecule, a polystyrene block from the viewpoint of the mechanical properties of the resulting resin composition and a block copolymer having units derived from isoprene in view of the effect of triggering the oxidation of the resin (b-1).

In other words, the resin (b-2) is preferably a styrene copolymer such as a styrene-isoprene copolymer and particularly preferably styrene-isoprene-styrene tri-block copolymer as a kind of the styrene-isoprene copolymer. In addition, preferably used herein further include hydrogenated styrene-diene copolymers. Such a copolymer may be prepared by the hydrogenation of a styrene-diene copolymer. Specific examples thereof are hydrogenated styrene-butadiene copolymers and hydrogenated styrene-isoprene copolymers.

The molecular weight of the resin (b-2) is not restricted to any specific range, but the number average molecular weight thereof preferably ranges from 1000 to 500,000 and more preferably 10,000 to 250,000 in the light of the dispersibility in the resin (b-1).

The resin (b-1) is preferably incorporated into the oxygen absorptive layer in a high rate so that it can form a matrix and that it can absorb a large quantity of oxygen gas through the oxidation thereof and accordingly, the content of the resin (b-1) more preferably ranges from 90 to 99% by mass and further preferably 92.5 to 97.5% by mass. On the other hand, the resin (b-2) is preferably incorporated into the oxygen absorptive layer in a lower rate so that it can present in the layer while being dispersed in the matrix of the resin (b-1) and that it can sufficiently show its function as the trigger for the oxidation of the resin (b-1) and accordingly, the content of the resin (b-2) in the oxygen absorptive layer preferably ranges from 1.0 to 10.0% by mass and more preferably 2.5 to 7.5% by mass while taking into consideration the moldability encountered when forming the resulting resin composition into a film, a sheet or a cup, a tray, a bottle or a tube. The dispersed state of the resin (b-2) within the matrix of the resin (b-1) can simply be confirmed by the observation using an electron microscope.

The transition metal catalyst (b-3) used in the present invention may be, for instance, metal components belonging to Group VIII of Periodic Table such as iron, cobalt and nickel; elements belonging to Group I of Periodic Table such as copper and silver; elements belonging to Group IV of Periodic Table such as tin, titanium and zirconium; elements belonging to Group V of Periodic Table such as vanadium; elements belonging to Group VI of Periodic Table such as chromium; and elements belonging to Group VII of Periodic Table such as manganese. Preferably used herein are metal elements belonging to Group VIII of Periodic Table such as iron, cobalt and nickel, with cobalt being particularly preferred because this element would ensure a high oxygen-absorbing rate.

The transition metal catalysts (b-3) practically used herein are inorganic acid salts, organic acid salts or complex salts of the foregoing transition metals each having a low valence.

Examples of such inorganic acid salts are halides such as chlorides; sulfur atom-containing oxyacid salts such as sulfates; phosphorus atom-containing oxyacid salts such as phosphates; and silicates.

Examples of such organic acid salts include carboxylic acid salts, sulfonic acid salts and phosphonic acid salts. Among them, preferably used herein are carboxylic acid salts and specific examples thereof are transition metal salts with acetic acid, propionic acid, isopropionic acid, butanoic acid, isobutanoic acid, pentanoic acid, iso-pentanoic acid, hexanoic acid, heptanoic acid, iso-heptanoic acid, octanoic acid, 2-ethyl hexanoic acid, nonanoic acid, 3,5,5-trimethyl hexanoic acid, decanoic acid, neo-decanoic acid, undecanoic acid, lauric acid, myristic acid, palmitic acid, margaric acid, stearic acid, arachic acid, linderic acid, thujic acid, petroselinic acid, oleic acid, linolic acid, linolenic acid, arachidonic acid, formic acid, oxalic acid, sulfamic acid and naphthenic acid.

The complexes of transition metals usable herein may be complexes with β-diketones or β-ketoacid esters and examples of such β-diketones or β-ketoacid esters are acetylacetone, ethyl acetoacetate, 1,3-cyclohexadione, methylenebis-1,3-cyclohexadione, 2-benzyl-1,3-cyclohexadione, acetyl tetralone, palmitoyl tetralone, stearoyl tetralone, benzoyl tetralone, 2-acetyl cyclohexanone, 2-benzoyl cyclo-hexanone, 2-acetyl-1,3-cyclohexadione, benzoyl-p-chlorobenzoyl-methane, bis(4-methylbenzoyl) methane, bis(2-hydroxybenzoyl) methane, benzoyl acetone, tri-benzoyl methane, diacetyl benzoyl methane, stearoyl benzoyl methane, palmitoyl benzoyl methane, lauroyl benzoyl methane, di-benzoyl methane, bis(4-chloro-benzoyl) methane, bis(methylene-3,4-dioxy-benzoyl) methane, benzoyl acetyl-phenyl methane, stearoyl (4-methoxy-benzoyl) methane, butanoyl acetone, di-stearoyl methane, stearoyl acetone, bis(cyclohexanoyl) methane and di-pivaloyl methane. In the present invention, these transition metal catalysts (b-3) may be used alone or in any combination of at least two of them.

It is preferred that the foregoing transition metal catalyst (b-3) is present at least in the resin (b-1) so that the progress of the oxidation reaction of the resin (b-1) can thus be accelerated and that the resin can efficiently absorb oxygen gas. More preferably, the foregoing transition metal catalyst (b-3) is incorporated into the resin (b-1) and the resin (b-2) to thus improve the function of the resin (b-2) as the trigger of the oxidation. Moreover, it is sufficient that the transition metal catalyst (b-3) is incorporated into the resin or resins in an amount sufficient for promoting the oxidation reaction of the resin (b-1), while taking into consideration the characteristic properties of the transition metal catalyst used. In general, the amount thereof preferably ranges from 10 to 3000 ppm and more preferably 50 to 1000 ppm in order to satisfactorily accelerate the oxidation reaction of the resin (b-1) and to prevent any reduction of the moldability due to the deterioration of the flow characteristics.

In the oxygen absorptive resin composition of the present invention, the mechanism of the way how the resin (b-2) show the foregoing trigger function has not yet been completely elucidated. One possible such mechanism would be as follows, which has been deduced by the inventors of this invention as a results of various investigations, but the mechanism of the foregoing trigger function of the resin (b-2) is not restricted to such a specific one at all.

It would be considered that, in the oxygen absorptive resin composition of the present invention, hydrogen atoms of the resin (b-2) are first extracted by the action of the transition metal catalyst (b-3) to thus generate radicals on the resin (b-2), that the radicals thus generated subsequently act on the resin (b-1) and hydrogen atoms of the resin (b-1) are likewise removed by the action of the transition metal catalyst (b-3) to thus generate radicals even on the resin (b-1) and that the resin (b-1) then undergoes the initial oxidation when the resin is brought into close contact with oxygen in the presence of the radicals thus generated. Thereafter, the oxidation reaction of the resin (b-1) would proceed like a chain reaction by the action of the transition metal catalyst according to the autoxidation theory and the resin (b-1) per se would thus serve as an oxygen-absorbing agent.

It would likewise be assumed that the presence of benzyl groups, in which the dissociation of the C—H bond on the benzyl group requires an energy lower than that required for the dissociation of another C—H bond, is quite important for the development of the trigger effect, and therefore, benzyl radicals are first generated to thus induce or initiate the foregoing trigger effect.

The oxygen absorptive layer (B) used in the invention may be formed by, for instance, the following method. The foregoing three components (b-1) to (b-3) may be mixed separately, or two of these three components are in advance mixed together and then the resulting mixture is admixed with the remaining third component. For instance, specific examples of such methods for mixing these components include one in which the resins (b-1) and (b-2) are mixed together in advance and the resulting mixture is then blended with the transition metal catalyst (b-3); one in which the resin (b-1) and the transition metal catalyst (b-3) are mixed together in advance and the resulting mixture is then blended with the resin (b-2); or one in which the resin (b-2) and the transition metal catalyst (b-3) are mixed together in advance and the resulting mixture is then blended with the resin (b-1).

The transition metal catalyst (b-3) can be blended with the resin (b-1) and/or the resin (b-2) by a variety of means. Examples of such methods include one in which the transition metal catalyst (b-3) is dry-blended with the resin, or one in which the transition metal catalyst (b-3) is dissolved in an organic solvent, the resulting solution is mixed with the powdery or particulate resin and the resulting mixture is, if desired, dried in an inert gas atmosphere. The amount of the transition metal catalyst (b-3) is quite small as compared with that of the resin and therefore, it is preferred to blend these components by the method in which the transition metal catalyst (b-3) is dissolved in an organic solvent and the resulting solution is then mixed with the powdery or particulate resin.

Examples of solvents used for preparing the foregoing solution of the transition metal catalyst (b-3) include alcohol solvents such as methanol, ethanol and butanol; ether type ones such as dimethyl ether, diethyl ether, methyl ethyl ether, tetrahydrofuran and dioxane; ketone type ones such as methyl ethyl ketone and cyclohexanone; hydrocarbon solvents such as n-hexane and cyclohexane. The concentration of the transition metal catalyst (b-3) preferably ranges from 5 to 90% by mass.

When mixing the resin (b-1), the resin (b-2) and the transition metal catalyst (b-3) and storing the composition prepared by the mixing thereof, these operations are preferably carried out in a non-oxidizing atmosphere to prevent any premature oxidation of the composition prior to the practical use thereof. In other words, it is preferred to carry out the blending and storing operations under reduced pressure or in a nitrogen gas stream.

It is preferred to use a vented extrusion-molding machine or an injection-molding machine or such a machine equipped with a dryer, since the components can be blended and dried at a stage prior to the molding process and accordingly, any particular consideration is not required for the storage of the resin containing the incorporated transition metal catalyst.

Alternatively, a desired composition may likewise be prepared by previously preparing a master batch containing the transition metal catalyst in a relatively high concentration and then dry-blending the master batch with the remaining resin component.

A variety of additives such as a radical initiator and a photosensitizer may be incorporated into the oxygen absorptive layer (B). Among these additives, it is preferred to incorporate, into the layer, high silica-content zeolite having a silica/alumina ratio of not less than 80, as will be detailed later. The content of these additives in the oxygen absorptive layer (B) preferably ranges from 0.5 to 5% by mass and particularly preferably 1 to 3% by mass.

The thickness of the oxygen absorptive layer (B) is preferably set at a level falling within the range of from 5 to 50 μm.

Alternatively, the material for forming the oxygen absorptive layer (B) usable herein may be an oxygen absorptive resin composition which comprises a resin having gas-barrier characteristics, a resin having carbon-carbon double bonds and transition metal catalyst. The resin having gas-barrier characteristics suitably used as a component of the oxygen absorptive resin composition may be those described above in connection with the oxygen-barrier layer (A-1). The resin having carbon-carbon double bonds suitably used herein may be resins having units derived from linear or cyclic, conjugated or non-conjugated polyenes such as those described above in connection with the foregoing resin (b-2). Further, the transition metal catalyst suitably used herein may be those described above in connection with the transition metal catalysts (b-3).

The high silica-content zeolite used herein is preferably those each having a silica/alumina ratio (molar ratio) of not less than 80, more preferably not less than 90 and most preferably 100 to 700. The high silica-content zeolite is quite effective for the trap of the by-products formed through oxidation in the present invention, as will be detailed in Examples given later and the layer containing the same has an improved ability to trap the by-products formed through oxidation under such a high humidity condition that the adsorptivity of the zeolite having a low silica/alumina ratio would be deteriorated and therefore, the use thereof would particularly be effective when using the same in the packaged body accommodating water-containing contents.

Examples of such high silica-content zeolite materials preferably used herein include ZSM-5 type zeolite, ZSM-11 type zeolite, ZSM-12 type zeolite, and Y-type zeolite. Examples of exchanged cations thereof are alkali metal ions such as sodium, lithium and potassium ions; and alkaline earth metal ions such as calcium and magnesium ions, which can be used alone or in any combination of at least two of them, with sodium cations being particularly preferred. It is preferred that substantially 100% of the exchanged cations are preferably constituted by the foregoing ones, but zeolite carrying hydrogen cations may be used in combination in such an amount that the presence thereof never adversely affects the desired effects of the present invention. The zeolite used in the present invention preferably has an average particle size ranging from 0.5 to 10 μm. Zeolite materials usable herein may easily be available from, for instance, Mizusawa Chemical Industries, Inc. and Tosoh Corporation.

In the present invention, the foregoing high silica-content zeolite may be used without any pre-treatment, but it is preferred that the high silica-content zeolite is first washed with water to remove any impurity present therein, followed by the blend thereof with a thermoplastic resin and the subsequent formation of the thermoplastic resin layer (C) using the resulting blend. In this case, the resulting resin layer (C) has substantially improved oxygen absorptive properties as compared with the high silica-content zeolite free of any washing treatment.

The content of the foregoing high silica-content zeolite in the thermoplastic resin layer (C) preferably ranges from 0.1 to 5% by mass and particularly preferably 0.5 to 2% by mass.

The thermoplastic resin used in the invention for the formation of the thermoplastic resin layer (C) is preferably regrind resin obtained by pulverizing, for instance, scraps which are generated during the processes for forming or molding sheets or containers such as bottles and which mainly comprise polyolefin type resins or comprise other thermoplastic resins. The use thereof would permit the achievement of the intended excellent effect of the present invention.

The regrind resin is usually subjected to heat history over a plurality of times in the light of the history thereof and therefore, it is a resin quite susceptible to, for instance, thermal decomposition to thus easily generate decomposition products through oxidation. In particular, when it comprises the scrap derived from containers having the foregoing oxygen absorptive layer, the decomposition products generated from the same may sometimes lead to the generation of an offensive odor and may sometimes be a cause of nasty taste. On the other hand, however, the restoration of, for instance, scraps generated during forming or molding processes into containers can be recognized as a step for the reduction of waste materials and it would thus permit the protection of the environment. In this connection, it would be an important subject to efficiently use the scraps. The incorporation of specific zeolite into the regrind resin-containing thermoplastic resin layer (C) can inhibit the generation or development of any offensive odor and nasty taste, while taking into consideration the environmental protection and accordingly, the intended effects of the present invention may further be improved.

In this case, only the regrind resin can be used as the resin for forming the thermoplastic resin layer (C), but it is preferred that a virgin resin is blended in an amount of not more than 50% by mass.

The thickness of the thermoplastic resin layer (C) is preferably set at a level falling within the range of from 150 to 1500 μm.

Examples of other thermoplastic resins used for forming the thermoplastic resin layer (C) used in the invention are polyolefin resins and polyester resins. Among them, examples of polyolefin resins include low density polyethylene (LDPE), medium density polyethylene (MDPE), high density polyethylene (HDPE), linear low density polyethylene (LLDPE), linear ultra low density polyethylene (LVLDPE), polypropylene (PP), ethylene-propylene copolymer, polybutene-1, ethylene-butene-1 copolymer, propylene-butene-1 copolymer, ethylene-propylene-butene-1 copolymer, ethylene-vinyl acetate copolymer, ionically crosslinked olefin copolymers, or blends thereof.

Examples of such polyester resins include polyethylene terephthalate (PET), polybutylene terephthalate (PBT), polyethylene naphthalate (PEN), or copolymerized polyesters thereof, and blends thereof.

A polyolefin type resin layer (D-1) may be arranged on the outer layer of the oxygen-barrier layer (A-1). In this respect, examples of the polyolefin resins used for forming the polyolefin type resin layer (D-1) are polyolefin resins.

The thickness of the polyolefin type resin layer (D-1) is preferably set at a level falling within the range of from 20 to 500 μm.

Further, a second oxygen-barrier layer (A-2) may be formed on the inner layer of the thermoplastic resin layer (C). Such a second oxygen-barrier layer (A-2) may be, for instance, one prepared from a resin having oxygen-barrier properties such as those described above in connection with the oxygen-barrier layer (A-1).

The thickness of the second oxygen-barrier layer (A-2) is preferably set at a level falling within the range of from 3 to 50 μm.

In the present invention, a polyolefin type resin layer (D-2) may further be arranged on the inner layer of the second oxygen-barrier layer. In this respect, examples of polyolefin resins used for forming the polyolefin type resin layer (D-2) include those described above in connection with the polyolefin resin layer (D-1).

The thickness of the polyolefin type resin layer (D-2) is preferably set at a level ranging from 50 to 1000 μm.

In the present invention, an intermediate layer may be arranged between the oxygen-barrier layer (B) and the thermoplastic resin layer (C). Such an intermediate layer may be a layer of a resin having gas-barrier properties, for instance, polyolefin resins such as polyethylene, polypropylene, ethylene-α-olefin copolymer and cyclic olefin copolymer; adhesive resins such as acid-modified polyolefin resins; polyester resins such as polyethylene terephthalate, polybutylene terephthalate and polyethylene naphthalate; or ethylene-vinyl alcohol copolymer. The use of such an intermediate layer would improve the oxygen-absorbing properties of the resulting product. In this connection, the thickness of the intermediate layer is preferably set at a level on the order of 2 to 30 μm.

Now referring to the attached FIG. 1, there is depicted an embodiment of the layer structure of the plastic multi-layer structure according to the present invention.

An adhesive layer may, if necessary, be arranged between each pair of neighboring resin layers constituting the laminate of the present invention. In this respect, it is preferred to arrange such adhesive layers between the oxygen-barrier layer (A-1) and the oxygen-absorbing layer (B); between the thermoplastic resin layer (C) and the second oxygen-barrier layer (A-2); between the second oxygen-barrier layer (A-2) and the polyolefin type resin layer (D-2); and/or between the oxygen-barrier layer (A-1) and the polyolefin type resin layer (D-1).

Moreover, when the oxygen-absorbing layer (B) consists of the oxygen absorptive resin composition, which comprises a resin having gas-barrier properties, a resin having carbon-carbon double bonds and a transition metal catalyst, it is preferred to arrange an adhesive layer between the oxygen-absorbing layer (B) and the thermoplastic resin layer (C).

Examples of such adhesive resins are polymers comprising, in the main chain or on the side chains thereof, carboxylic acid, carboxylic acid anhydride, carboxylic acid residues in a concentration ranging from 1 to 700 meq/100 g resin and preferably 10 to 500 meq/100 g resin.

Specific examples of such adhesive resins include ethylene-acrylic acid copolymer, ionically crosslinked olefin copolymer, maleic acid anhydride-grafted polyethylene, maleic acid anhydride-grafted polypropylene, acrylic acid-grafted polyolefin, ethylene-vinyl acetate copolymer, copolymerized polyester and copolymerized polyamide, or any combination of at least two of them.

These adhesive resins are useful in the lamination through the simultaneous extrusion or the sandwich-lamination techniques. In addition, a thermosetting adhesive resin such as an isocyanate type or epoxy type adhesive resin may likewise be used in the lamination, through adhesion, of previously formed films of a resin having gas-barrier properties and a moisture-resistant resin.

Each layer constituting the plastic multi-layer structure according to the present invention may, if necessary, comprise a variety of additives such as a filler, a coloring agent, a heat stabilizer, a weathering agent, an antioxidant, an age resister, a light stabilizer, a UV absorber, an antistatic agent, a lubricant such as metal soap and wax, a modifying resin or a rubber material and these additives may be incorporated into these layers according to any formulation known per se.

The plastic multi-layer structure of the present invention can be prepared by, for instance, the co-extrusion molding method known per se. For instance, a desired laminate may be prepared by the extrusion-molding method which makes use of a number of extruders corresponding to the kinds of resins to be used and using multi-layered or multiple dies.

Thus, the present invention permits the formation of various laminates such as parisons for forming films, sheets, bottles, cups, caps and tubes; or preforms for forming pipes, bottles or tubes.

Packaging materials such as films can be used in the form of bags for packaging having a variety of shapes. Examples of such packaging materials include usual pouches such as three-side-sealed and four-side-sealed pouches; gusseted pouches; standing pouches; and pillow type packaging bags. These bags may be prepared by any known bag-manufacturing method.

A parison, a pipe or a preform is pinched off by a pair of split molds, followed by blowing a fluid therein to thus form a bottle without any difficulty. Moreover, a pipe or a preform is cooled, then heated to an orienting temperature, drawn along the axial direction and simultaneously blow-drawn by the action of a fluid pressure in the peripheral direction to thus give an blow-drawn bottle.

Furthermore, a film or a sheet is subjected to a molding or forming means such as the vacuum forming technique, the air pressure forming technique, the stretch forming technique and the plug-assist forming technique to thus form a packaging container having a cup-like or tray-like shape.

A multi-layer injection-molded body can be prepared by the use of a plurality of injection molding machines corresponding to the kinds of resins to be used according to the co-injection molding technique or the sequential injection molding technique.

In addition, a multi-layer film or a multi-layer sheet can be prepared by the extrusion-coating technique or the sandwich lamination technique and it is also possible to prepare a multi-layer film or sheet by the dry-lamination of preformed films.

The plastic multi-layer structure according to the present invention can efficiently cut off any oxygen-penetration and therefore, it may suitably be used as a material for packaging materials or packaging containers. This laminate can absorb oxygen gas over a long period of time and accordingly, it is quite useful as a material for a container which can prevent any reduction or deterioration of the taste and flavor of the contents thereof and likewise permits the improvement of the shelf-life of the contents.

In particular, the laminate of the present invention is useful as a packaging material for packaging contents, which are easily deteriorated in the presence of oxygen, for instance, beverages such as beer, wine, fruit juices and carbonated soft drinks; foods such as fruits, nuts, vegetables, meat products, foods for infants, coffee, jam, mayonnaise, ketchup, edible oils, dressings, sauce, foods boiled down in soy, and dairy products; and other contents such as pharmaceuticals and cosmetic.

When a variety of containers such as bottles and pouches are formed from the plastic multi-layer structure of the present invention, contents such as solid materials or liquid materials are packaged therein and then stored under high temperature and high humidity conditions (for instance, at a temperature of 30° C. and a relative humidity of 80%), the container prepared from the structure of the present invention has such an advantage that it can hold the contents thereof while remaining their fresh taste and flavor unchanged, as compared with the results observed when the same contents are packaged in the container prepared from the conventional oxygen-barrier resin and then stored. The container prepared from the structure of the invention is effective, in particular, when the contents are liquid materials, beverages and orally administered pharmaceuticals having high moisture contents.

Specific examples of the present invention will hereunder be described in detail, but the present invention is not restricted to these specific examples at all.

EXAMPLES

The following Table 1 shows the characteristic properties of the zeolite used in the following Reference Examples, Examples and Comparative Examples.

TABLE 1

| Trade Name | Na-ZSM-5-100 | HSZ-390HUA | EX122 |
|---|---|---|---|
| Distributor | Mizusawa Industries Chemicals Ltd. | Tosoh Corporation | Mizusawa Industries Chemicals Ltd. |
| Crystalline structure | ZSM-5 Type | Y-Type | ZSM-5 Type |
| Average particle size (µm) | 4.69 | 6 | 2.25 |
| Maximum particle size (mm) | 14.49 | 15.6 | 5.69 |
| Ratio: $SiO_2/Al_2O_3$ | 100 | 510 | 33 |

Reference Example 1

Evaluation of Adsorptivity of Zeolite

The zeolite materials used in the present invention were analyzed according to the following procedures for the evaluation of the adsorptivity thereof.

To air tightly sealable 85 cc volume containers, there were added 1 g of an oxygen-absorbing material (test 1) consisting of a powdery 5/95 (mass ratio) mixture of a hydrogenated styrene-butadiene-styrene tri-block copolymer (a product capable of serving as an oxidation-trigger commercially available from Asahi Chemical Industry Co., Ltd. under the trade name of TAFTECH P2000) and a low density polyethylene (a product having a density of 0.92 and an MI of 0.5, commercially available from Nippon Polyethylene Co., Ltd. under the trade name of JB221R); a mixture of 1 g of the oxygen-absorbing material and 20 mg of powdery zeolite ZSM-5-100 (test 2); and a mixture of 1 g of the oxygen-absorbing material and 20 mg of powdery zeolite HSZ-390HUA (test 3), respectively. Then each container was sealed to oxidize the oxygen-absorbing material. Then the head space gas present in each container was analyzed using a purge and trap type (Tekmar 4000) GC-MS device (column DB-1, available from Agilent Company). The results thus obtained are plotted on FIG. 2. In this figure, the results observed for the tests 1 to 3 are shown in FIGS. 2a, 2b and 2c, respectively.

Figure 2:
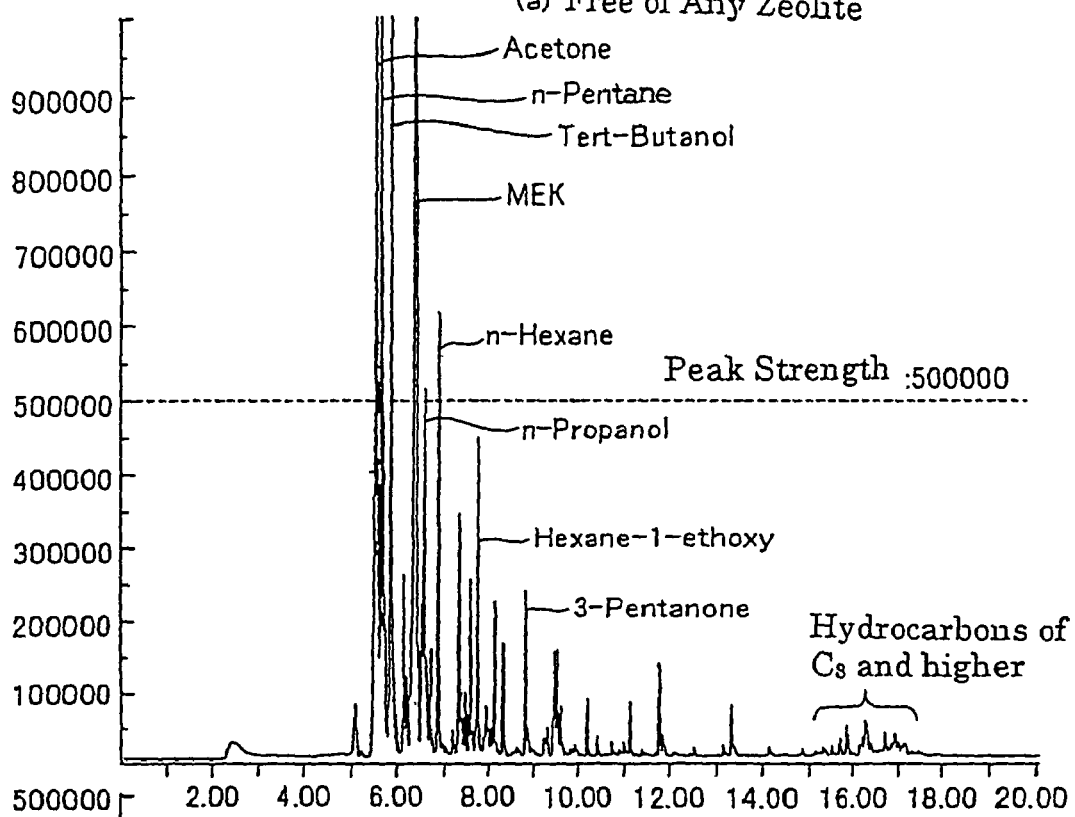
FIG. 2 shows the ability of the structure to adsorb oxidation by-products observed when using a various kinds of zeolite materials.
Figure 2:
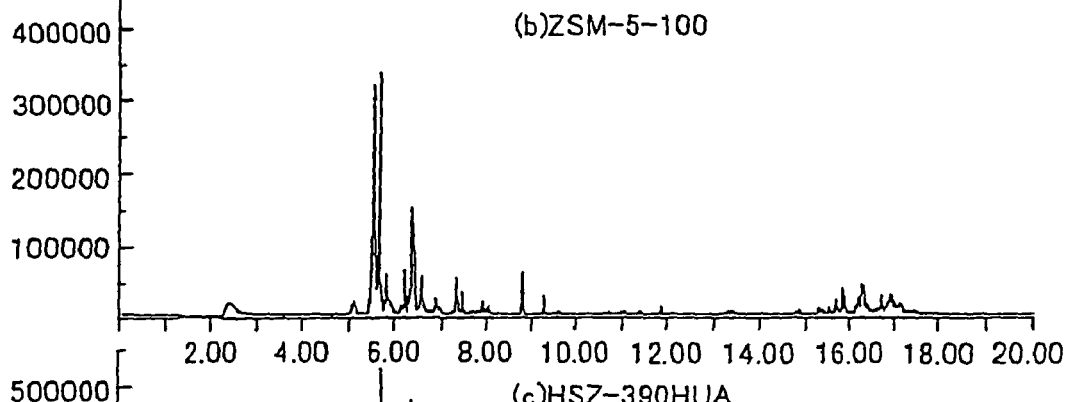
Figure 2:
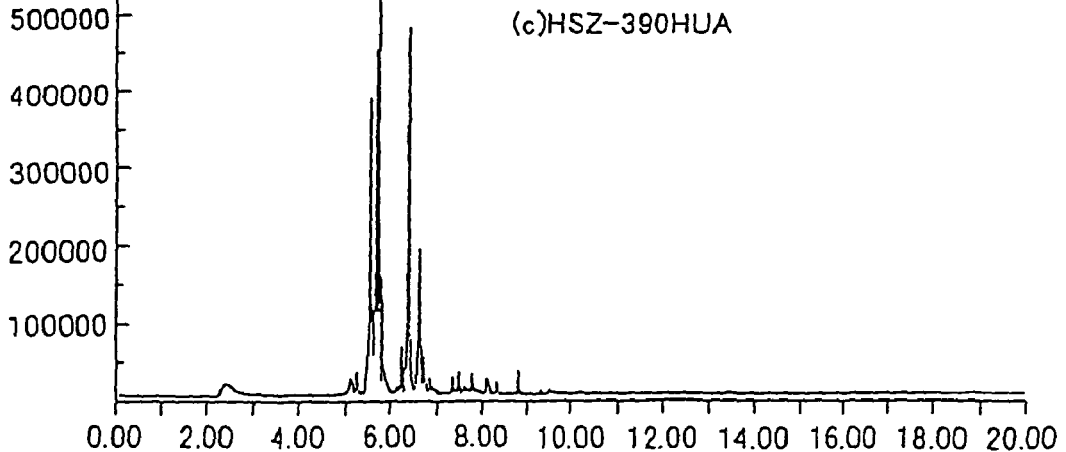

The data plotted on FIG. 2 clearly indicate that the quantities of, for instance, aldehyde, ketone and hydrocarbons present in the head space gases are significantly reduced by the incorporation of the zeolite materials into the containers. In particular, the compounds having not less than 4 carbon atoms and less soluble in water not only become a cause of offensive odor, but also adversely affect the taste and flavor of the contents, but the foregoing data indicate that the addition of zeolite permits the particularly efficient reduction of these adversely affecting substances.

Then zeolite materials ZSM-5-100 and HSZ-390HUA were likewise inspected for the ability thereof to adsorb several kinds of model substances as the oxidation by-products such as aldehyde, ketone and alcohol, according to the method described below.

To each of vials for the head space gas chromatography (GC) having an internal volume of 22 ml, there was added 0.5 to 2.0 mg of zeolite powder in an environment having a humidity of not more than 30% RH and nitrogen gas was substituted for the internal atmosphere of each vial. In this experiment, there were used ketones, aldehydes and alcohols each having not less than 4 carbon atoms as molecules to be adsorbed. To each vial, there were added these substances in the form of 1% by mass methanol solutions or acetone solutions (5 to 10 µl each) and then the vials were air tightly sealed. These vials were stored at 30° C. and, after one day, the head space gases present in each vial were analyzed by the GC analysis and the amount of each volatile substance adsorbed was calculated on the basis of the difference between the measured value and that observed for the blank.

A moisture-controlling vial was prepared by adding, to a vial, a glass insert containing 0.15 ml of distilled water and the same procedures used above were repeated to carry out the evaluation thereof. In addition, the zeolite materials were likewise inspected for the adsorptivity under 100% RH conditions. The results thus obtained are summarized in the following Table 2.

TABLE 2

| Evaluation at Humidity of not more than 30% RH | | | | | |
|---|---|---|---|---|---|
| | Inspection of Zeolite for Deodorizing Ability | | | | |
| Zeolite | 2-Hexanone | MIBK | n-Butanal | n-Heptanal | 5-Methyl-2-hexanol |
| ZSM-5-100 | 0.18 | 0.13 | 0.31 | 3.44 | 0.28 |
| HSZ-390HUA | 0.36 | 0.28 | 0.372 | 2.787 | 0.633 |

| Evaluation at Humidity of 100% RH | | | | |
|---|---|---|---|---|
| | Inspection of Zeolite for Deodorizing Ability | | | |
| Zeolite | 2-Hexanone | MIBK | n-Butanal | n-Heptanal |
| ZSM-5-100 | 0.85 | 0.47 | 1.01 | 3.27 |
| HSZ-390HUA | — | 1.55 | — | — |

The data shown in Table 2 indicate that the zeolite having a silica/alumina ratio of not less than 80 possesses an excellent ability to trap all of the ketones, aldehydes and alcohols examined.

The data shown in Table 2 prove such a quite interesting fact that these zeolite materials show improved ability to trap chemical substances under high humidity conditions in which the usual zeolite and porous silica materials have deteriorated abilities to trap chemical substances as compared with that observed under the dry conditions. This clearly indicates that the zeolite having a silica/alumina ratio of not less than 80 used in the invention can act as a favorable agent for trapping by-products formed through oxidation, when applying the same to a container for containing and storing contents containing moisture in a high humidity environment such as those frequently encountered in Japan.

The following are examples of multi-layer containers each comprising an oxygen absorptive layer made of a resin containing such a zeolite material as an intermediate layer.

Example 1

[Preparation of Master Batch of Zeolite]

Zeolite (5 parts by mass) was blended with 95 parts by mass of low density polyethylene (LDPE) resin (JB221R available from Nippon Polyethylene Co., Ltd.) by operating a twin-screw extruder (TEM-35B available from Toshiba Machine Co., Ltd.) equipped with a strand die fitted to the outlet portion thereof at a rotational number of screw of 100 rpm using a powder feeder while evacuating to a high vacuum through a vent, followed by drawing a strand at a molding temperature of 200° C. to thus form pellets of zeolite master batch.

[Preparation of Oxygen-Absorbing Material]

To 95 parts by mass of LDPE (JB221R available from Nippon Polyethylene Co., Ltd.), there were added 2.5 parts by mass of a hydrogenated styrene-butadiene-styrene tri-block copolymer (TAFTECH P2000 available from Asahi Chemical Industry Co., Ltd.), 2.5 parts by mass of a hydrogenated styrene-butadiene rubber (DYNALON 1320P: available from JSR Co., Ltd.) and cobalt stearate (available from Dainippon Ink & Chemicals, Inc.) in an amount of 90 ppm as expressed in terms of the amount reduced to that of cobalt, followed by drawing a strand at a molding temperature of 200° C. in a twin-screw extruder (TEM-35B available from Toshiba Machine Co., Ltd.), operated at a rotational number of screw of 100 rpm and equipped with a strand die fitted to the outlet portion thereof, while evacuating to a high vacuum through a vent to thus form pellets of an oxygen-absorbing material A.

[Preparation of Regrind Resin]

Using a direct blow molding machine and LDPE (JB221R available from Nippon Polyethylene Co., Ltd.), an adhesive (MODIC L522 available from Mitsubishi Chemical Industry Co., Ltd.), an ethylene-vinyl alcohol copolymer (EP-F101B available from Kuraray Co., Ltd.), and the foregoing oxygen-absorbing material, there was prepared a multi-layer parison having the following composition: 80% by mass of LDPE, 4% by mass of the adhesive, 6% by mass of the ethylene-vinyl alcohol copolymer (EVOH), and 10% by mass of the oxygen-absorbing material (having a layer structure: LDPE/adhesive/EVOH/adhesive/oxygen-absorbing material/LDPE/adhesive/EVOH/adhesive/LDPE arranged in this order from the outermost layer) and the resulting parison was crushed in a crusher to thus give regrind resin chips.

Separately, regrind resin chips used for forming a reference bottle for the flavor-evaluation were prepared by forming a multi-layer parison in such a manner that it comprised 90% by mass of LDPE (JB221), 4% by mass of an adhesive (MODIC L522), and 6% by mass of an ethylene-vinyl alcohol copolymer (EVOH), followed by pulverization of the resulting parison to thus form regrind resin chips.

[Preparation of Reference (Control) Bottle]

The following two multi-layer structured bottles were prepared using a direct blow-molding machine: (1) a bottle having a multi-layer structure comprising the following 10 layers of 4 kinds of materials: LDPE layer (10)/adhesive layer (1)/EVOH layer (3)/adhesive layer (1)/LDPE layer (10)/regrind layer (45)/adhesive layer (1)/EVOH layer (3)/adhesive layer (1)/LDPE layer (25) in this order from the outermost layer (each numerical value in the parenthesis indicates the percentage of each corresponding layer in the multi-layer structure), having an inner volume of 525 ml and a mass of 20 g; (2) a bottle having a multi-layer structure comprising the following 7 layers of 4 kinds of materials: LDPE layer (10)/adhesive layer (1)/EVOH layer (3)/adhesive layer (1)/LDPE layer (10)/regrind layer (45)/LDPE layer (30) in this order from the outermost layer (each numerical value in the parenthesis indicates the percentage of each corresponding layer in the multi-layer structure), having an inner volume of 525 ml and a mass of 20 g. The resins used herein are the same as those used above.

The total thickness of the thinnest portion of the bottle's trunk part was found to be 300 μm.

In this connection, the resin used for forming the regrind layer was prepared by dry-blending 50 parts by mass of the foregoing regrind resin chips used for forming the reference bottle and 50 parts by mass of LDPE.

[Preparation of Bottles According to This Example]

The material used herein for forming a regrind resin layer was a dry-blend of 50 parts by mass of the foregoing regrind resin chips, 30 parts by mass of LDPE (JB221R available from Nippon Polyethylene Co., Ltd.) and 20 parts by mass of the master batch of ZSM-5-100 and the oxygen-absorbing material A was used as the material for forming an oxygen-absorbing layer.

Then the following multi-layer structured bottle was prepared using a direct blow-molding machine: a bottle having a multi-layer structure comprising the following 10 layers of 5 kinds of materials: LDPE layer (10)/adhesive layer (1)/EVOH layer (3)/adhesive layer (1)/oxygen-absorptive layer (10)/regrind layer (45)/adhesive layer (1)/EVOH layer (3)/adhesive layer (1)/LDPE layer (25) in this order from the outermost layer (each numerical value in the parenthesis indicates the percentage of each corresponding layer in the multi-layer structure), having an inner volume of 525 ml and a mass of 20 g.

The total thickness of the thinnest portion of the bottle's trunk part was found to be 300 μm.

[Evaluation of Odor, and Taste and Flavor of Contents]

To the multi-layer structured container thus prepared, there was added 500 ml of distilled water heated to a temperature ranging from 85 to 90° C. and then the bottle was heat-sealed at the opening thereof with a capping material comprising an aluminum foil serving as a barrier layer. The bottle was then stored under the conditions of 22° C./60% RH over 6 months, followed by breaking the cap of the bottle and the evaluation of the odor given out of the bottle and the taste and flavor of the contents according to the sensory test.

The odor was evaluated on the basis of the following three criteria: ○: the odor was found to be almost identical to that of the reference; Δ: there were detected slight offensive odor and nasty taste; and x: there were detected strong offensive odor and severely nasty taste.

As a result, it was found that the odor and taste observed for the bottle of the present invention were almost identical to those observed for the reference bottle.

Example 2

The same procedures used in Example 1 were repeated except for using a dry-blend of 50 parts by mass of the foregoing regrind resin chips, 30 parts by mass of LDPE (JB221R available from Nippon Polyethylene Co., Ltd.) and 20 parts by mass of the master batch of HSZ-390HUA as a material for forming a regrind resin layer to thus form a bottle having a multi-layer structure, identical to that of the bottle prepared in Example 1, comprising 10 layers of 5 kinds of materials.

The resulting bottle was likewise subjected to the same evaluation test concerning the odor, taste and flavor used in Example 1 using the foregoing 4 kind/10 layer multi-layer reference bottle as a control for the comparison. As a result, the odor and taste observed for the bottle of the present invention were found to be almost identical to those observed for the reference bottle.

Example 3

To 95 parts by mass of LDPE (JB221R available from Nippon Polyethylene Co., Ltd.), there were added 2.5 parts by mass of a hydrogenated styrene-butadiene-styrene tri-block copolymer (TAFTECH P2000 available from Asahi Chemical Industry Co., Ltd.), 2.5 parts by mass of a hydrogenated styrene-butadiene rubber (DYNALON 1320P: available from JSR Co., Ltd.) and cobalt stearate (available from Dainippon Ink & Chemicals, Inc.) in an amount of 90 ppm as expressed in terms of the amount reduced to that of cobalt, followed by the introduction of the resulting blend into a twin-screw extruder (TEM-35B available from Toshiba Machine Co., Ltd.) equipped with a strand die fitted to the outlet portion thereof through the hopper thereof. Then zeolite (HSZ-390HUA available from Tosoh Corporation) was fed to the extruder through a powder feeder according to the side-feed mode in an amount of 2 parts by mass per 98 parts by mass of the blend, followed by drawing a strand at a molding temperature of 200° C. in the extruder while operating the extruder at a rotational number of screw of 100 rpm and evacuating to a high vacuum through a vent to thus form pellets of an oxygen-absorbing material B.

Further, the same procedures used in Example 1 were repeated except for using a dry-blend of 50 parts by mass of the foregoing regrind resin chips, 30 parts by mass of LDPE (JB221R available from Nippon Polyethylene Co., Ltd.), 10 parts by mass of the master batch of HSZ-390HUA and 10 parts by mass of the master batch of ZSM-5-100 as a material for forming a regrind resin layer and the oxygen-absorbing material B as a material for forming an oxygen-absorptive layer to thus form a bottle having a multi-layer structure, identical to that of the bottle prepared in Example 1, comprising 10 layers of 5 kinds of materials.

The resulting bottle was likewise subjected to the same evaluation test concerning the odor, taste and flavor used in Example 1 using the foregoing 4 kind/10 layer multi-layer reference bottle as a control for the comparison. As a result, the odor and taste observed for the bottle of the present invention were found to be almost identical to those observed for the reference bottle.

Example 4

The same procedures used in Example 3 were repeated except that ZSM-5-100 (available from Mizusawa Industries Chemicals Ltd.) was substituted for the zeolite used in Example 3 to thus form pellets of an oxygen-absorbing material C.

Further, the same procedures used in Example 1 were repeated except for using a dry-blend of 50 parts by mass of the foregoing regrind resin chips, 40 parts by mass of LDPE (JB221R available from Nippon Polyethylene Co., Ltd.) and 10 parts by mass of the master batch of HSZ-390HUA as a material for forming a regrind resin layer and the oxygen-absorbing material C as a material for forming an oxygen-absorptive layer to thus form a bottle having a multi-layer structure, identical to that of the bottle prepared in Example 1, comprising 10 layers of 5 kinds of materials.

The resulting bottle was likewise subjected to the same evaluation test concerning the odor, taste and flavor used in Example 1 using the foregoing 4 kind/10 layer multi-layer reference bottle as a control for the comparison. As a result, the odor and taste observed for the bottle of the present invention were found to be almost identical to those observed for the reference bottle.

Example 5

The material used herein for forming a regrind resin layer was a dry-blend of 50 parts by mass of the foregoing regrind resin chips, 30 parts by mass of LDPE (JB221R available from Nippon Polyethylene Co., Ltd.) and 20 parts by mass of the master batch of ZSM-5-100 and the oxygen-absorbing material B was used as the material for forming an oxygen-absorbing layer.

Then the following multi-layer structured bottle was prepared using a direct blow-molding machine: a bottle having a multi-layer structure comprising the following 7 layers of 5 kinds of materials: LDPE layer (10)/adhesive layer (1)/

EVOH layer (3)/adhesive layer (1)/oxygen-absorptive layer (10)/regrind layer (45)/LDPE layer (30) in this order from the outermost layer (each numerical value in the parenthesis indicates the percentage of each corresponding layer in the bottle), having an inner volume of 525 ml and a mass of 20 g.

The total thickness of the thinnest portion of the bottle's trunk part was found to be 300 μm.

The resulting bottle was likewise subjected to the same evaluation test concerning the odor, taste and flavor used in Example 1 using the foregoing 4 kind/7 layer multi-layer reference bottle as a control for the comparison. As a result, the odor and taste observed for the bottle of the present invention were found to be almost identical to those observed for the reference bottle.

Example 6

[Preparation of Oxygen-Absorbing Material]

There were blended pellets of an ethylene-vinyl alcohol copolymer resin prepared by the copolymerization of 32 mole % ethylene (EP-F101B available from Kuraray Co. Ltd.) and cobalt neodecanoate (DICNATE 5000 available from Dainippon Ink & Chemicals, Inc.) in an amount of 350 ppm as expressed in terms of the amount reduced to that of cobalt, followed by kneading in a stirring-dryer (available from DALTON) and the subsequent introduction thereof into the hopper of a twin-screw extruder (TEM-35B available from Toshiba Machine Co., Ltd.) equipped with a strand die fitted to the outlet portion thereof. Then a maleic acid anhydride-modified polyisoprene (LIR-403 available from Kuraray Co. Ltd.) was introduced into the extruder through a liquid feeder according to the side-feed mode in an amount of 50 parts by mass per 950 parts by mass of the ethylene-vinyl alcohol copolymer resin comprising the cobalt neodecanoate incorporated therein, followed by drawing a strand at a molding temperature of 200° C. in the extruder while operating the extruder at a rotational number of screw of 100 rpm and evacuating to a low vacuum through a vent to thus form pellets of an oxygen-absorbing material D.

[Preparation of Regrind Resin]

Using a direct blow molding machine, and using LDPE (JB221R available from Nippon Polyethylene Co., Ltd.), an adhesive (MODIC L522 available from Mitsubishi Chemical Industry Co., Ltd.), an ethylene-vinyl alcohol copolymer (EP-F101B available from Kuraray Co., Ltd.), and the foregoing oxygen-absorbing material, there was prepared a multi-layer parison having the following composition: 84% by mass of LDPE, 4% by mass of the adhesive, 6% by mass of the ethylene-vinyl alcohol copolymer (EVOH), and 6% by mass of the oxygen-absorbing material (having a layer structure: LDPE/adhesive/EVOH/oxygen-absorbing material/adhesive/LDPE/adhesive/EVOH/adhesive/LDPE arranged in this order from the outermost layer) and the resulting parison was crushed in a crusher to thus give regrind resin chips.

Separately, regrind resin chips used for forming a reference bottle for the flavor-evaluation were prepared by forming a multi-layer parison in such a manner that it comprised 84% by mass of LDPE (JB221), 4% by mass of an adhesive (MODIC L522), and 12% by mass of an ethylene-vinyl alcohol copolymer (EVOH), followed by pulverization of the resulting parison to thus form regrind resin chips.

[Preparation of Reference (Control) Bottle]

There was herein prepared a bottle having a multi-layer structure comprising the following 9 layers of 4 kinds of materials: LDPE layer (10)/adhesive layer (1)/EVOH layer (9)/adhesive layer (1)/regrind layer (45)/adhesive layer (1)/EVOH layer (3)/adhesive layer (1)/LDPE layer (29) in this order from the outermost layer (each numerical value in the parenthesis indicates the percentage of each corresponding layer in the multi-layer structure), having an inner volume of 525 ml and a mass of 20 g. The resins used herein are the same as those used above.

The total thickness of the thinnest portion of the bottle's trunk part was found to be 300 μm.

In this connection, the resin used for forming the regrind layer was prepared by dry-blending 50 parts by mass of the foregoing regrind resin chips used for forming the reference bottle and 50 parts by mass of LDPE.

[Preparation of Bottle According to this Example]

The material used herein for forming a regrind resin layer was a dry-blend of 50 parts by mass of the foregoing regrind resin chips, 30 parts by mass of LDPE (JB221R available from Nippon Polyethylene Co., Ltd.) and 20 parts by mass of the master batch of ZSM-5-100 and the oxygen-absorbing material b was used as the material for forming an oxygen-absorbing layer.

Then the following multi-layer structured bottle was prepared using a direct blow-molding machine: a bottle having a multi-layer structure comprising the following 9 layers of 5 kinds of materials: (1) LDPE layer (10)/adhesive layer (1)/EVOH layer (3)/oxygen-absorptive layer (6)/adhesive layer (1)/regrind layer (45)/adhesive layer (1)/EVOH layer (3)/adhesive layer (1)/LDPE layer (29) in this order from the outermost layer (each numerical value in the parenthesis indicates the percentage of each corresponding layer in the multi-layer structure), having an inner volume of 525 ml and a mass of 20 g.

The total thickness of the thinnest portion of the bottle's trunk part was found to be 300 μm.

The resulting bottle was likewise subjected to the same evaluation test concerning the odor, taste and flavor used in Example 1 using the foregoing 4 kind/9 layer multi-layer reference bottle as a control for the comparison. As a result, the odor and taste observed for the bottle of the present invention were found to be almost identical to those observed for the reference bottle.

Comparative Example 1

The same procedures used in Example 1 were repeated except for using a mixture obtained by dry-blending 50 parts by mass of the foregoing regrind resin chips and 50 parts by mass of LDPE (JB221R available from Nippon Polyethylene Co., Ltd.) as the material for forming the regrind layer to thus form a multi-layer structured bottle comprising 10 layers of 5 kinds of materials.

The resulting bottle was inspected for the odor, taste and flavor and the results thus obtained were compared with those observed for the 4 kind/10 layer multi-layer reference bottle as a control for the comparison. As a result, there were detected or observed offensive odor and nasty taste.

Comparative Example 2

The same procedures used in Example 1 were repeated except for using a mixture obtained by dry-blending 50 parts by mass of the foregoing regrind resin chips, 30 parts by mass of LDPE (JB221R available from Nippon Polyethylene Co., Ltd.) and 20 parts by mass of a master batch of EX122 as the material for forming the regrind layer to thus form a multi-layer structured bottle comprising 10 layers of 5 kinds of materials.

The resulting bottle was inspected for the odor, taste and flavor and the results thus obtained were compared with those observed for the 4 kind/10 layer multi-layer reference bottle as a control for the comparison. As a result, there were detected or observed offensive odor and nasty taste. The silica/alumina ratio of the zeolite used was found to be 33 which was smaller than the lower limit of the ratio specified in the present invention and accordingly, the zeolite used was insufficient in the ability of trapping oxidation by-products. For this reason, the bottle of this Comparative Example could not prevent the generation or development of any offensive odor and nasty taste.

Comparative Example 3

The same procedures used in Example 1 were repeated except for using a mixture obtained by dry-blending 50 parts by mass of the foregoing regrind resin chips and 50 parts by mass of LDPE (JB221R available from Nippon Polyethylene Co., Ltd.) as the material for forming the regrind layer and the oxygen-absorbing material B was used as the material for forming an oxygen-absorptive layer to thus form a multi-layer structured bottle comprising 10 layers of 5 kinds of materials.

The resulting bottle was inspected for the odor, taste and flavor and the results thus obtained were compared with those observed for the 4 kind/10 layer multi-layer reference bottle as a control for the comparison. As a result, there were detected or observed offensive odor and nasty taste, although the degrees thereof were reduced as compared with those observed for the bottles prepared in Comparative Examples 1 and 2. As has been described above, the offensive odor and nasty taste originated from the oxidation by-products could not be eliminated completely in case where the regrind resin layer was free of any zeolite having a silica/alumina ratio of not less than 80.

The results obtained in the foregoing Examples and Comparative Examples are summarized in the following Table 3.

TABLE 3

Summary of Examples and Comparative Examples

| Ex. No. | Layer structure (each num. in paren.: cons. ratio expressed in % by mass) | Oxygen-absorbing agent | Zeolite in SC | Zeolite in REG | Odor/taste eval. Results |
|---|---|---|---|---|---|
| 1 | Ext.) LDPE(10)/AD(1)/EVOH(3)/AD(1)/SC(10)/REG(45)/AD(1)/EVOH(3)/AD(1)/LDPE(25) (Int. | Polyolefin type | None | ZSM-5-100 (1 wt %) | ○ |
| 2 | Ext.) LDPE(10)/AD(1)/EVOH(3)/AD(1)/SC(10)/REG(45)/AD(1)/EVOH(3)/AD(1)/LDPE(25) (Int. | Polyolefin type | None | HSZ-390HUA (1 wt %) | ○ |
| 3 | Ext.) LDPE(10)/AD(1)/EVOH(3)/AD(1)/SC(10)/REG(45)/AD(1)/EVOH(3)/AD(1)/LDPE(25) (Int. | Polyolefin type | HSZ-390 HUA (2 wt %) | ZSM-5-100 (0.5 wt %); HSZ-390HUA (0.5 wt %) | ○ |
| 4 | Ext.) LDPE(10)/AD(1)/EVOH(3)/AD(1)/SC(10)/REG(45)/AD(1)/EVOH(3)/AD(1)/LDPE(25) (Int. | Polyolefin type | ZSM-5-100 (2 wt %) | HSZ-390HUA (0.5 wt %) | ○ |
| 5 | Ext.) LDPE(10)/AD(1)/EVOH(3)/AD(1)/SC(10)/REG(45)/LDPE(30) (Int. | Polyolefin type | HSZ-390 HUA (2 wt %) | ZSM-5-100 (1 wt %) | ○ |
| 6 | Ext.) LDPE(10)/AD(1)/EVOH(3)/SC(6)/AD(1)/REG(45)/AD(1)/EVOH(3)/AD(1)/LDPE(29) (Int. | EVOH type | None | ZSM-5-100 (1 wt %) | ○ |
| 1* | Ext.) LDPE(10)/AD(1)/EVOH(3)/AD(1)/SC(10)/REG(45)/AD(1)/EVOH(3)/AD(1)/LDPE(25) (Int. | Polyolefin type | None | None | x |
| 2* | Ext.) LDPE(10)/AD(1)/EVOH(3)/AD(1)/SC(10)/REG(45)/AD(1)/EVOH(3)/AD(1)/LDPE(25) (Int. | Polyolefin type | None | EX122 (1 wt %) | x |
| 3* | Ext.) LDPE(10)/AD(1)/EVOH(3)/AD(1)/SC(10)/ | Polyolefin type | HSZ-390 HUA | None | Δ |

TABLE 3-continued

Summary of Examples and Comparative Examples

| Ex. No. | Layer structure (each num. in paren.: cons. ratio expressed in % by mass) | Oxygen-absorbing agent | Zeolite in SC | Zeolite in REG | Odor/taste eval. Results |
|---|---|---|---|---|---|
| | REG(45)/AD(1)/EVOH (3)/AD(1)/LDPE(25) (Int. | | (2 wt %) | | |

*Comparative Example
AD: Adhesive layer;
SC: Oxygen-absorbing layer;
REG: Regrind resin layer
o: Identical to Control;
Δ: Offensive odor and nasty taste were observed;
x: Strong offensive odor and strong nasty taste were observed.

What is claimed is:

1. A plastic multi-layer structure comprising a polyolefin resin layer (D-1), an oxygen-barrier layer (A-1); an oxygen absorptive layer (B); a thermoplastic resin layer (C) which contains (i) a high silica zeolite material having a silica/alumina ratio of not less than 80 and sodium cations as substantially 100% of exchanged ions and (ii) a regrind resin, a second oxygen-barrier layer (A-2), and a polyolefin resin layer (D-2), in this layer order from the exterior to the interior of the structure.

2. The plastic multi-layer structure as set forth in claim 1, wherein the oxygen-barrier layer (A-1) is formed from at least one member selected from the group consisting of ethylene-vinyl alcohol copolymers, polyamide resins and polyester resins.

3. The plastic multi-layer structure as set forth in claim 1, wherein the oxygen absorptive layer (B) comprises a polyolefin resin (b-1) prepared by polymerizing an olefin having 2 to 8 carbon atoms, a hydrogenated styrene-diene copolymer (b-2), which can serve as a trigger for the oxidation of the resin (b-1), and a transition metal catalyst (b-3), a weight ratio of (b-1) to (b-2) being 90/10 to 99/1; a second oxygen-barrier layer (A-2) and a polyolefin resin layer (D-2), in this order from the exterior to interior.

4. The plastic multi-layer structure as set forth in claim 3, wherein the polyolefin resin (b-1) is a thermoplastic resin having ethylene structures in the molecular structure and the resin (b-2) is a hydrogenated styrene-diene copolymer.

5. The plastic multi-layer structure as set forth in claim 1, wherein the oxygen absorptive layer (B) comprises a resin having gas-barrier properties, a resin having carbon-carbon double bonds, and a transition metal catalyst.

6. The plastic multi-layer structure as set forth in claim 1, wherein the oxygen absorptive layer (B) comprises a zeolite material having a high silica content, whose silica/alumina ratio is not less than 80.

7. The plastic multi-layer structure as set forth in claim 1, wherein adhesive resin layers are positioned between the oxygen-barrier layer (A-1) and the oxygen absorptive layer (B); between the thermoplastic resin layer (C) and the second oxygen-barrier layer (A-2); between the second oxygen-barrier layer (A-2) and the polyolefin resin layer (D-2); and between the oxygen-barrier layer (A-2) and the polyolefin resin layer (D-1), respectively.

8. The plastic multi-layer structure as set forth in claim 1, wherein an intermediate layer is arranged between the oxygen absorptive layer (B) and the thermoplastic resin layer (C).

9. A container produced from a plastic multi-layer structure as set forth in claim 1.

10. The container as set forth in claim 9, wherein it is used for accommodating a moisture-containing food.

11. The plastic multi-layer structure as set forth in claim 1, wherein the high silica zeolite material is selected from the group consisting of ZSM-5 type zeolite, ZSM-11 type zeolite, Y-type zeolite and combinations thereof.

12. The plastic multi-layer structure as set forth in claim 1, wherein the high silica zeolite material is a ZSM-5 type zeolite.

13. A plastic multi-layer structure comprising a polyolefin resin layer (D-1), an oxygen-barrier layer (A-1); an oxygen absorptive layer (B); a thermoplastic resin layer (C) which contains (i) a high silica zeolite material having a silica/alumina ratio of not less than 80 and sodium ions as substantially 100% of exchanged cations and (ii) a regrind resin, a second oxygen-barrier layer (A-2), and a polyolefin resin layer (D-2), in this layer order from the exterior to the interior of the structure.

14. The plastic multi-layer structure as set forth in claim 13, wherein the oxygen-barrier layer (A-1) is formed from at least one member selected from the group consisting of ethylene-vinyl alcohol copolymers, polyamide resins and polyester resins.

15. The plastic multi-layer structure as set forth in claim 13, wherein the oxygen absorptive layer (B) comprises a polyolefin resin (b-1) prepared by polymerizing an olefin having 2 to 8 carbon atoms, a hydrogenated styrene-diene copolymer (b-2), which can serve as a trigger for the oxidation of the resin (b-1), and a transition metal catalyst (b-3), a weight ratio of (b-1) to (b-2) being 90/10 to 99/1; a second oxygen-barrier layer (A-2) and a polyolefin resin layer (D-2), in this order from the exterior to interior.

16. The plastic multi-layer structure as set forth in claim 15, wherein the polyolefin resin (b-1) is a thermoplastic resin having ethylene structures in the molecular structure and the resin (b-2) is a hydrogenated styrene-diene copolymer.

17. The plastic multi-layer structure as set forth in claim 13, wherein the oxygen absorptive layer (B) comprises a resin having gas-barrier properties, a resin having carbon-carbon double bonds, and a transition metal catalyst.

18. The plastic multi-layer structure as set forth in claim 13, wherein the oxygen absorptive layer (B) comprises a zeolite material having a high silica content, whose silica/alumina ratio is not less than 80.

19. The plastic multi-layer structure as set forth in claim 13, wherein adhesive resin layers are positioned between the oxygen-barrier layer (A-1) and the oxygen absorptive layer (B); between the thermoplastic resin layer (C) and the second oxygen-barrier layer (A-2); between the second oxygen-barrier layer (A-2) and the polyolefin resin layer (D-2); and between the oxygen-barrier layer (A-2) and the polyolefin resin layer (D-1), respectively.

20. The plastic multi-layer structure as set forth in claim 13, wherein an intermediate layer is arranged between the oxygen absorptive layer (B) and the thermoplastic resin layer (C).

21. A container produced from a plastic multi-layer structure as set forth in claim 13.

22. The container as set forth in claim 9, wherein it is used for accommodating a moisture-containing food.

23. The plastic multi-layer structure as set forth in claim 13, wherein the high silica zeolite material is selected from the group consisting of ZSM-5 type zeolite, ZSM-11 type zeolite, Y-type zeolite and combinations thereof.

24. The plastic multi-layer structure as set forth in claim 13, wherein the high silica zeolite material is a ZSM-5 type zeolite.

* * * * *